United States Patent
Neuman

(10) Patent No.: US 9,869,116 B2
(45) Date of Patent: Jan. 16, 2018

(54) PNEUMATIC OPERATED HINGE AND LATCH SYSTEM

(71) Applicant: Daniel Ray Neuman, Loami, IL (US)

(72) Inventor: Daniel Ray Neuman, Loami, IL (US)

( * ) Notice: Subject to any disclaimer, the term of this patent is extended or adjusted under 35 U.S.C. 154(b) by 22 days.

(21) Appl. No.: 15/246,905

(22) Filed: Aug. 25, 2016

(65) Prior Publication Data

US 2017/0292309 A1  Oct. 12, 2017

Related U.S. Application Data

(60) Provisional application No. 62/320,222, filed on Apr. 8, 2016.

(51) Int. Cl.
| | | |
|---|---|---|
| *E05F 15/53* | (2015.01) | |
| *E05D 11/10* | (2006.01) | |
| *E05D 7/12* | (2006.01) | |

(52) U.S. Cl.
CPC .......... *E05F 15/53* (2015.01); *E05D 11/1014* (2013.01); *E05D 7/12* (2013.01); *E05Y 2900/602* (2013.01)

(58) Field of Classification Search
CPC . E05D 7/12; E05D 11/1014; E05Y 2900/602; B65D 55/02; B65D 90/008; B65D 90/22; E05F 15/53; E05F 1/1091; F16J 13/20
See application file for complete search history.

(56) References Cited

U.S. PATENT DOCUMENTS

| | | | | |
|---|---|---|---|---|
| 2,538,980 A * | 1/1951 | Payne, Jr. | ............... | B64C 25/16 292/196 |
| 2,556,578 A * | 6/1951 | Dohm, Jr. | ............... | A22C 11/02 220/262 |
| 2,584,500 A * | 2/1952 | Riordan | .................... | F16J 13/20 220/324 |
| 3,406,997 A * | 10/1968 | Wilcox | .................. | B63B 19/24 220/324 |
| 3,722,936 A * | 3/1973 | Stubert | ................. | E05L 351/02 292/256.75 |
| 6,138,412 A * | 10/2000 | Rieckmann | ............. | E05F 15/53 49/340 |
| 6,386,598 B1 * | 5/2002 | Dykstra | ................. | B65D 90/00 220/315 |
| 2002/0100225 A1* | 8/2002 | Sisk | ........................ | B65D 90/10 52/20 |
| 2006/0010769 A1* | 1/2006 | Pelz | ........................ | B64C 1/1407 49/141 |
| 2011/0210124 A1* | 9/2011 | Da Silva | ............... | B65F 1/1447 220/484 |
| 2012/0325812 A1* | 12/2012 | Guinart Pallares | ...... | F16J 13/22 220/212 |
| 2015/0291350 A1* | 10/2015 | Sewell | ..................... | F16J 13/18 220/260 |

* cited by examiner

*Primary Examiner* — Justin B Rephann
(74) *Attorney, Agent, or Firm* — Dunlap Bennett & Ludwig PLLC

(57) ABSTRACT

A pneumatic operated hinge and latch system for agriculture seed box lids preventing loss of the lid during adverse weather conditions, wherein the system provides a more reliable and secure locked engagement and an easy transition to an unlocked engagement.

9 Claims, 4 Drawing Sheets

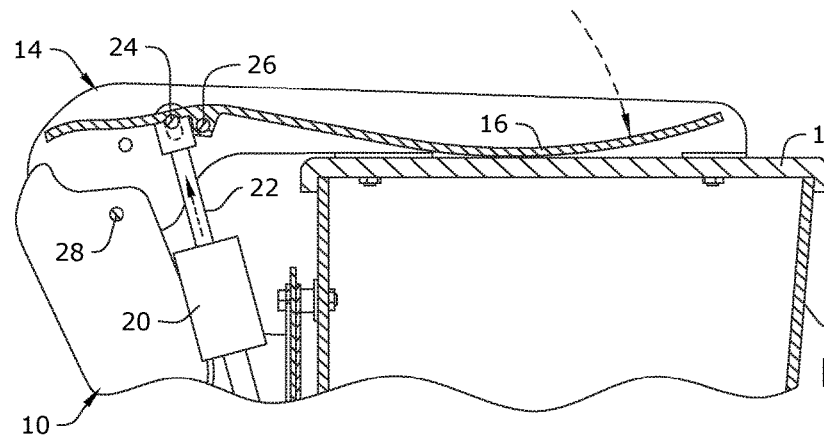
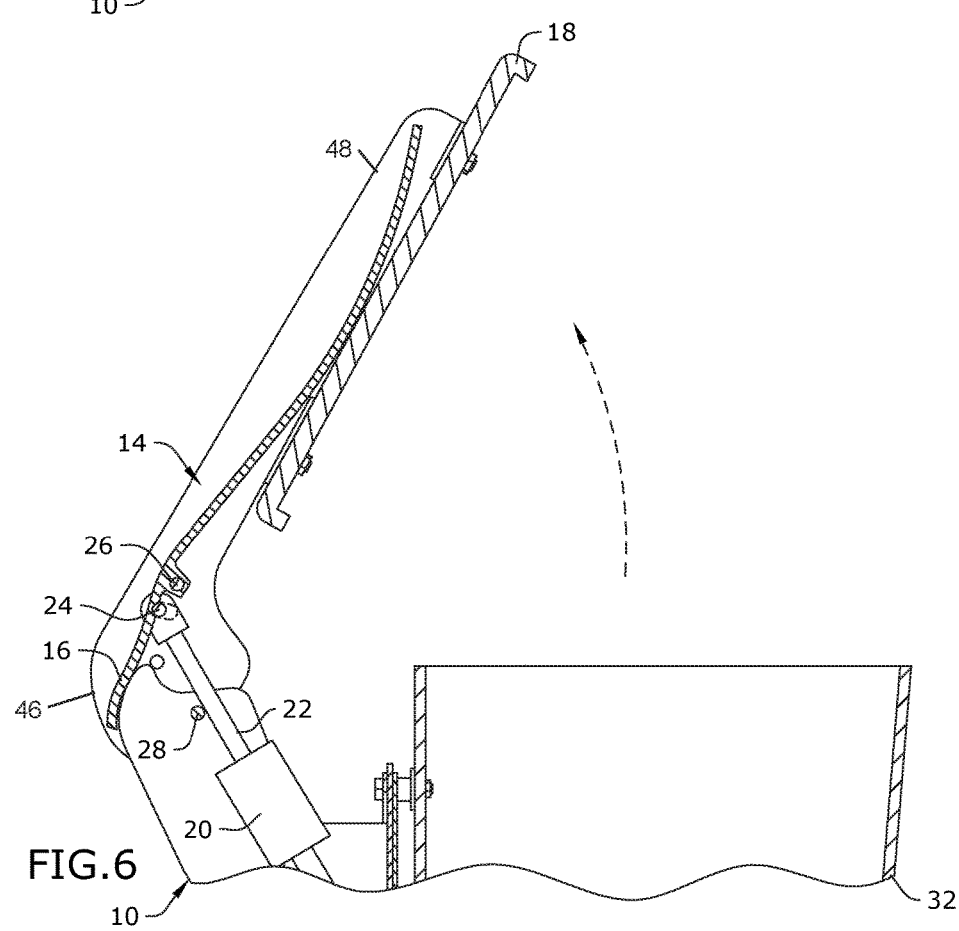

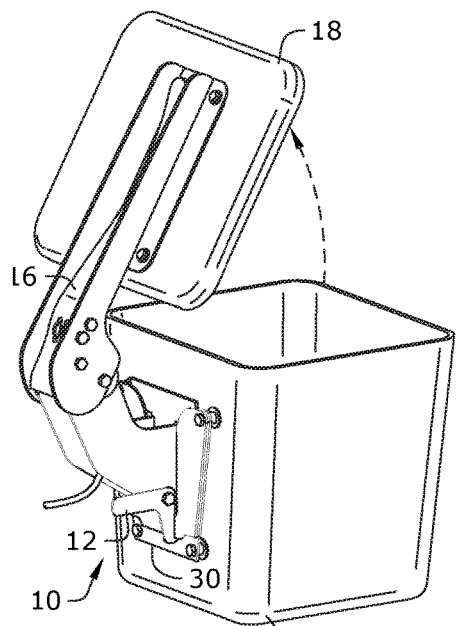
FIG.7
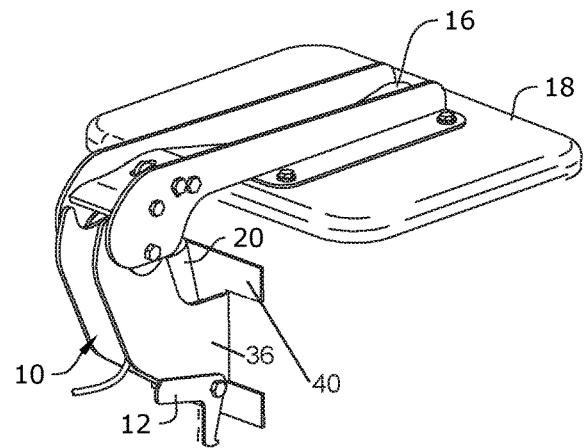
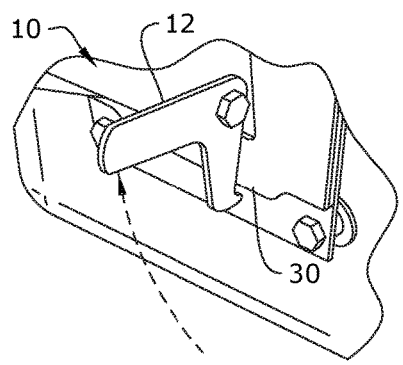
FIG.8
FIG.9

PNEUMATIC OPERATED HINGE AND LATCH SYSTEM

CROSS-REFERENCE TO RELATED APPLICATION

This application claims the benefit of priority of U.S. provisional application No. 62/320,222, filed 8 Apr. 2016, the contents of which are herein incorporated by reference.

BACKGROUND OF THE INVENTION

The present invention relates to hinge and latch systems and, more particularly, a pneumatic operated hinge and latch system for agriculture seed box lids on individual row units.

Currently, individual planter seed box lids typically are manually removed with no secure latching device. This can be problematic because of the lids are subject to adverse weather conditions, especially high speed wind loads and vibrational loads from nearby farm equipment. Once taken off by such loads, the lids tend to get lost over a possibly expansive farmland. Moreover, the manual task of removing the lid tends to be a lengthy process, exhausting valuable time, especially because of the needs of user to regularly inspect seed levels or refill the container with seed. Furthermore, most planter box lids have no hinge rather only a tab to hold lids close, and thus no easy way to secure or open the lid. Some may have hinges but they are small and unreliable, and so they tend to fail.

As can be seen, there is a need for a pneumatic operated hinge and latch system for agriculture seed box lids preventing loss of the lid during adverse weather conditions, wherein the system provides a more reliable and secure locked engagement and an easy transition to a selectable unlocked engagement.

SUMMARY OF THE INVENTION

In one aspect of the present invention, a hinge and latch system includes a bracket extending from a bracket proximal end to a bracket distal end; an arm extending from an arm proximal end to an arm distal end; a first pivotal connection joining the bracket distal end and the arm distal end; a latch extending from a latch distal end to a latch proximal end; a second pivotal connection joining the latch to the arm so that the latch moves between an unlocked engagement and a locked engagement; a spring mechanism biasing the latch in the locked engagement; an attachment point disposed along the latch between the second pivot connection and the latch distal end; and a pneumatic actuator interconnecting the bracket proximal end and the attachment point for moving the arm between a closed engagement and an open engagement, wherein the open engagement precludes the locked engagement.

In another aspect of the present invention, the hinge and latch system includes a bracket extending from a bracket proximal end to a bracket distal end; an arm extending from an arm proximal end to an arm distal end; a first pivotal connection joining the bracket distal end and the arm distal end; a latch extending from a latch distal end to a latch proximal end; a second pivotal connection joining the latch to the arm so that the latch moves between an unlocked engagement and a locked engagement; a spring mechanism biasing the latch in the locked engagement; an attachment point disposed along the latch between the second pivot connection and the latch distal end; a pneumatic actuator interconnecting the bracket proximal end and the attachment point for selectively moving the arm between a closed engagement and a range of open engagements, wherein any open engagement precludes the locked engagement, wherein the pneumatic actuator includes at least one piston, wherein the closed engagement releases pneumatic pressure within the at least piston; a container sleeve for slidably receiving the bracket proximal end; a locking member pivotally attached to the bracket proximal end so that the locking member moves from an unlocked condition to a locked condition, preventing the bracket proximal end from sliding out of the container sleeve; and two spaced apart wind flanges transversely joined to the upper arm so that the latch nests between the two spaced apart wind flanges in the locked engagement.

These and other features, aspects and advantages of the present invention will become better understood with reference to the following drawings, description and claims.

BRIEF DESCRIPTION OF THE DRAWINGS

FIG. 5 is a detail section view of an exemplary embodiment of the present invention, demonstrating moving to an open engagement and the locked engagement;

FIG. 6 is a detail section view of an exemplary embodiment of the present invention, demonstrating the open engagement;

FIG. 7 is a rear perspective view of an exemplary embodiment of the present invention, demonstrating the open engagement;

FIG. 8 is a detail perspective view of an exemplary embodiment of the present invention, demonstrating moving to an unlocked condition; and FIG. 9 is a rear detailed perspective view of an exemplary embodiment of the present invention, in use shown removing the present invention.

DETAILED DESCRIPTION OF THE INVENTION

Figure 1:
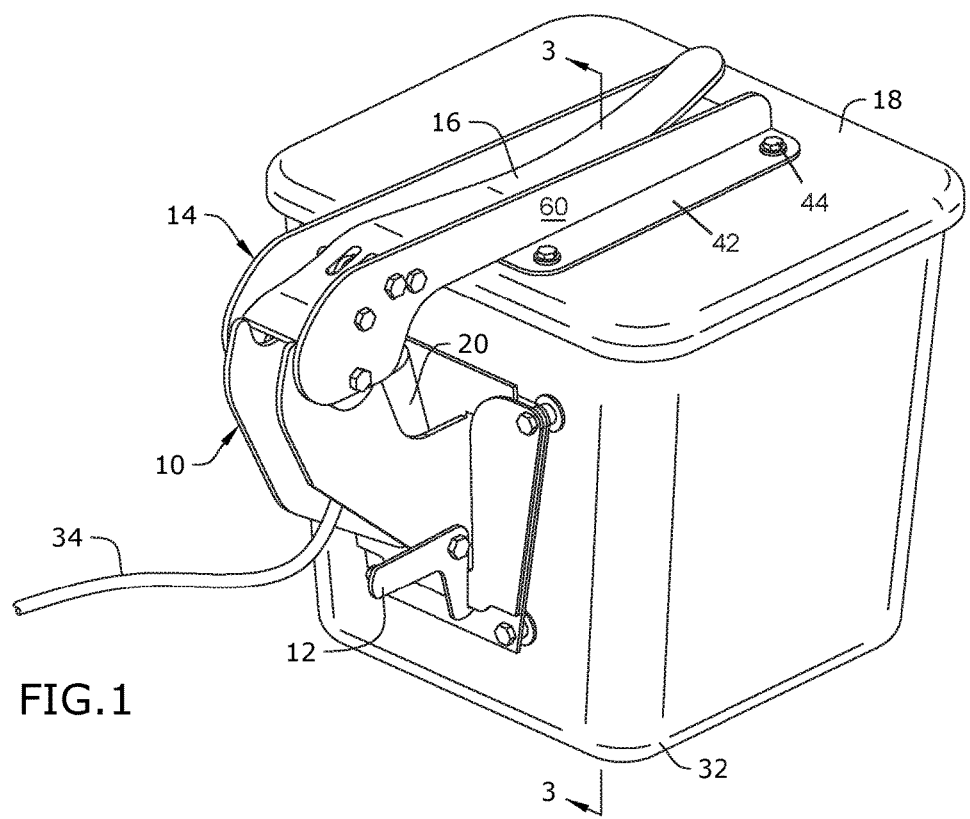
FIG. 1 is a rear perspective view of an exemplary embodiment of the present invention, shown in use.
Figure 2:
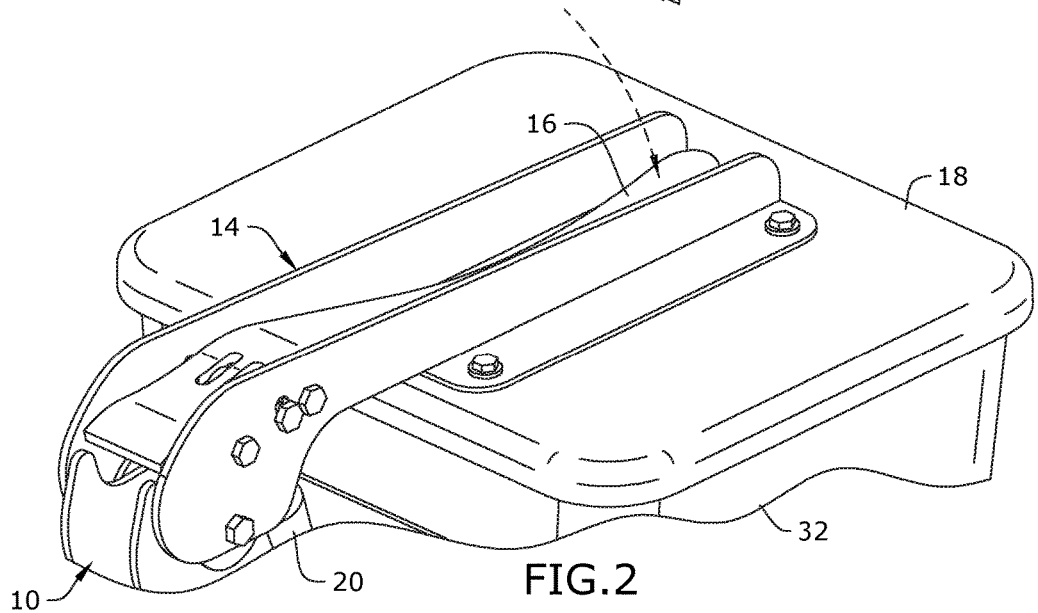
FIG. 2 is a rear detailed perspective view of an exemplary embodiment of the present invention, demonstrating moving to an activated locked engagement.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a pneumatic operated hinge and latch system for agriculture seed box lids preventing loss of the lid during adverse weather conditions, wherein the system provides a more reliable and secure locked engagement and an easy transition to a selectable unlocked engagement.

Referring to FIGS. 1 through 9, the present invention may include a pneumatic hinge and latch system 100 for a container 32. The hinge and latch system 100 may embody a lower bracket 10 connected to an upper arm 14 by a first pivotal connection 28, wherein the lower bracket 10 is removably attached to the container 32, and wherein the upper arm 14 is attached to a lid 18 of the container 32.

The lower bracket 10 may extend from a bracket proximal end 36 to a bracket distal end 38, wherein the bracket proximal end 36 is connected to the container 32. The bracket distal end 38 may be generally spaced apart from the container 32, and in some embodiments, disposed upward of the proximal end. It being understood that terms "upper" are "lower," as well as their derivatives (e.g., "upward" being a derivative of "upper") and equivalents, are being made in reference to the lid 18 disposed on an 'upper' portion of the container 32 as illustrated in the Figures for the sake of efficient enablement. But it should also be understood that in other embodiments the present invention may have the 'lower bracket' disposed upwards of the 'upper arm', and the like, and still be contemplated by the present invention so long as the present invention functions in accordance with the disclosure as described herein.

The bracket proximal end 36 may provide a container mounting plate 40. The present invention may provide a container sleeve 30 attached to the container 32, wherein the container sleeve 30 is adapted to slidably receive the container mounting plate 40, thereby making the bracket proximal end 36 removably attached to the container 32. A locking member 12 may be pivotally attached to the bracket proximal end 36 so that the locking member 12 may move from an unlocked condition to a locked condition, wherein the locking member 12 engages the container sleeve 30, and wherein moving to the unlocked condition enables the bracket proximal end 36 to be removed from the container sleeve 30, as illustrated in FIGS. 8 and 9.

The upper arm 14 may be attached to the lid 18 by a lid mounting plate 42 and fasteners 44. The first pivotal connection 28 may enable the present invention to accommodate various container 32 and lid 18 configurations as the upper arm 14 and the lower bracket 10 may move relative to each other as the container and mounting plates 40 and 42 are attached to the container 32 and lid 18, respectively.

The upper arm 14 may extend from an arm distal end 46 to an arm proximal end 48, wherein the arm proximal end 48 attaches to the lid mounting plate 42, and wherein the arm distal end 46 engages the bracket proximal end 36 via the first pivotal connection 28.

Figure 3:
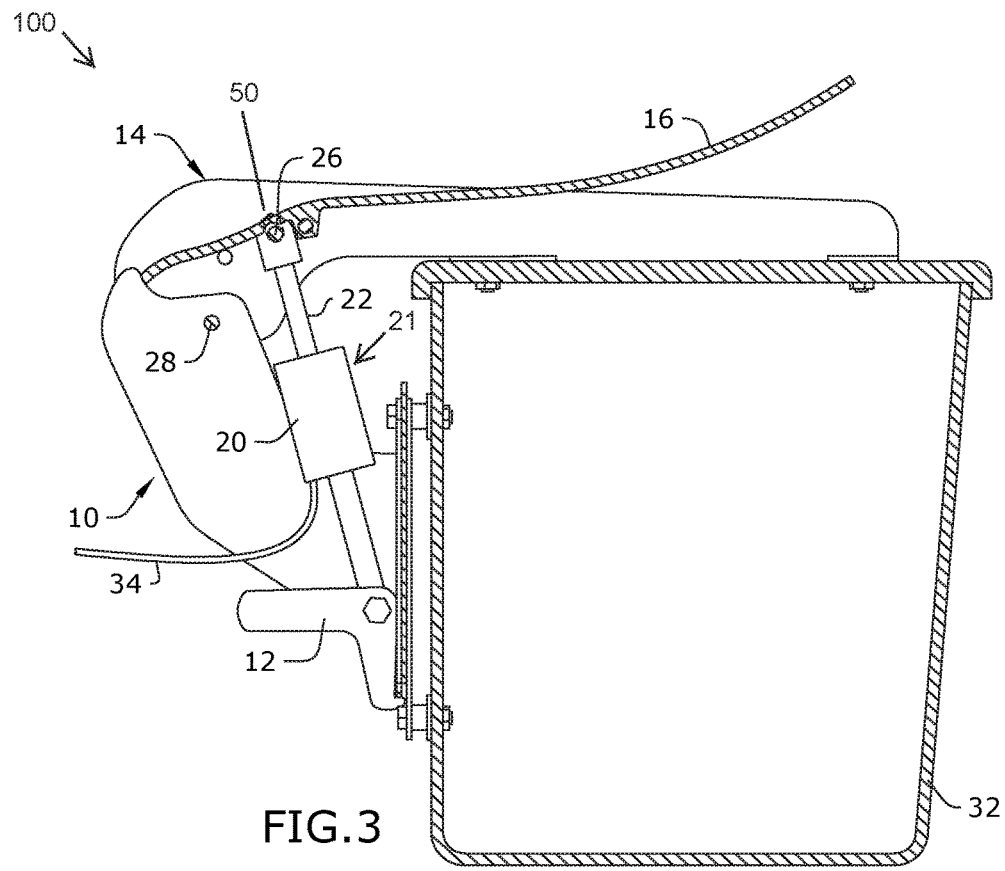
FIG. 3 is a section view of an exemplary embodiment of the present invention, shown along line 3-3 in FIG. 1.
Figure 4:
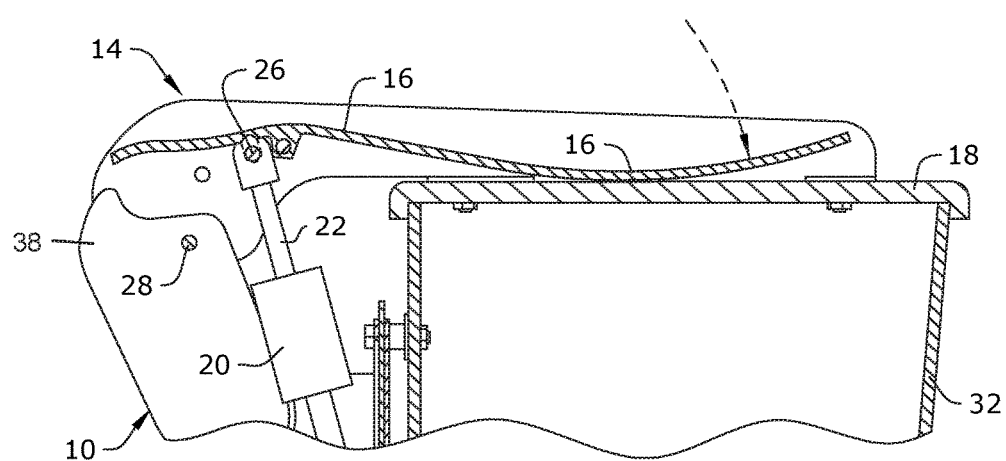
FIG. 4 is a detail section view of an exemplary embodiment of the present invention, demonstrating a closed engagement moving to the activated locked engagement.

A latch 16 may be connected to the upper arm 14 by a second pivotal connection 26 near the arm distal end 46. In certain embodiments, the first and second pivotal connection 28 and 26 may be spaced apart by a few inches. The second pivotal connection 26 may enable the latch 16 to be moved between an unlocked engagement and a locked engagement, preventing the lid 18 being removed from its associated container opening. In certain embodiments, the latch 16 may be spring loaded and thus biased in the locked engagement by a spring mechanism 50. The latch may be manually moved to the unlocked engagement by urging the end opposing the second pivotal connection 26 away from the arm distal end 46, as illustrated in FIG. 3. Two spaced apart wind flanges 60 may be transversely joined to the upper arm 14 so that the latch in the locked engagement nests between the two spaced apart wind flanges 60, protected from the wind or other lateral forces.

The latch 16 may extend beyond the second pivotal connection 26 (relative to the arm distal end 46) by a few inches providing an attachment point 24. The attachment point 24 may be a third pivotal connection.

A pneumatic actuator 21 may extend from the bracket proximal end 36 to the attachment point 24. The pneumatic actuator 21 may make use of pressurized gases (such as air) or fluids fed by a supply of pneumatic pressure 34 for a piston 20 so that an associated piston shaft 22 transfers the force developed by the supply of pneumatic pressure 34 to move the attachment point 24 between a closed engagement and open engagement as illustrated in FIG. 6. The pneumatic actuator 21 may be selectively (pneumatically) operated to move between a range of open engagements. The open engagement translates to the lid 18 being removed from the container 32, as illustrated in FIG. 6. The pneumatic actuator 21 may be remotely (pneumatically) operated to move between the closed and open engagements, though the latch 16 can be manually operated so that when it moves to the closed engagement, pneumatic pressure within the pneumatic actuator 21 is released, allowing the spring return and/or gravity to move the lid 18 closed in the locked engagement. At the point of lid contact with the container 32 the latch 16 may become activated via the spring mechanism 50 and secures the lid 18 to the container 32 in the locked engagement. It being understood that there may be a point where the lid 18 contacts the container 32 in the closed engagement, wherein the locking engagement is yet to immediately manifest.

A method of using the present invention may include the following. The hinge and latch system 100 disclosed above may be provided. A user may remotely or manually control the supply of pneumatic pressure 34 to the pneumatic actuator 21, lifting the spring held latch 16 before continuing its stroke to selectively move the attachment point 24 to a predetermined open engagement, lifting the lid 18 off of container 32 for various application—e.g., inspecting, refilling, or emptying the container 32 or the like. Moving to the closed engagement, for example manually, the lid 18 releases the pneumatic pressure within the pneumatic actuator 21 allowing the spring return built into the pneumatic actuator 21/latch 16 to help gravity close the lid 18 and move it to the locked engagement. The pneumatic actuator 21 may then be selectively controlled to raise or lower and hold the lid 18 at another predetermined position relative to the container opening.

In certain embodiments, the user may slide the lower bracket 10 from the container 32 to facilitate the filling of the container 32. The present invention may be used in many type of containers benefiting from the hinge and latch system 100, for example garbage containers and the like.

It should be understood, of course, that the foregoing relates to exemplary embodiments of the invention and that modifications may be made without departing from the spirit and scope of the invention as set forth in the following claims.

What is claimed is:
1. A device, comprising:
a bracket extending from a bracket proximal end to a bracket distal end;
an arm extending from an arm proximal end to an arm distal end;
a first pivotal connection joining the bracket distal end and the arm distal end;
a latch extending from a latch distal end to a latch proximal end;
a second pivotal connection joining the latch to the arm so that the latch moves between an unlocked engagement and a locked engagement;
a spring mechanism biasing the latch in the locked engagement;
an attachment point disposed along the latch between the second pivot connection and the latch distal end; and a pneumatic actuator interconnecting the bracket proximal end and the attachment point for moving the arm between a closed engagement and an open engagement, wherein the open engagement precludes the locked engagement.

2. The device of claim 1, wherein the pneumatic actuator is configured to selectively provide a range for open engagements.

3. The device of claim 1, further comprising a container sleeve for slidably receiving the bracket proximal end.

4. The device of claim 3, further comprising a locking member pivotally attached to the bracket proximal end so that the locking member moves from an unlocked condition to a locked condition, preventing the bracket proximal end from sliding out of the container sleeve.

5. The device of claim 1, wherein the pneumatic actuator includes at least one piston, wherein the closed engagement releases pneumatic pressure within the at least piston.

6. The device of claim 1, wherein the arm proximal end provides a planar lid mounting plate.

7. The device of claim 1, further comprising two spaced apart wind flanges transversely joined to the upper arm so that the latch nests between the two spaced apart wind flanges in the locked engagement.

8. The device of claim 1, wherein the latch manually moves to the unlocked engagement by urging the end opposing the second pivotal connection away from the arm distal end.

9. A device, comprising:
- a bracket extending from a bracket proximal end to a bracket distal end;
- an arm extending from an arm proximal end to an arm distal end;
- a first pivotal connection joining the bracket distal end and the arm distal end;
- a latch extending from a latch distal end to a latch proximal end;
- a second pivotal connection joining the latch to the arm so that the latch moves between an unlocked engagement and a locked engagement;
- a spring mechanism biasing the latch in the locked engagement;
- an attachment point disposed along the latch between the second pivot connection and the latch distal end;
- a pneumatic actuator interconnecting the bracket proximal end and the attachment point for selectively moving the arm between a closed engagement and a range of open engagements, wherein any open engagement precludes the locked engagement, wherein the pneumatic actuator includes at least one piston, wherein the closed engagement releases pneumatic pressure within the at least piston;
- a container sleeve for slidably receiving the bracket proximal end;
- a locking member pivotally attached to the bracket proximal end so that the locking member moves from an unlocked condition to a locked condition, preventing the bracket proximal end from sliding out of the container sleeve; and
- two spaced apart wind flanges transversely joined to the upper arm so that the latch nests between the two spaced apart wind flanges in the locked engagement.

\* \* \* \* \*